(12) United States Patent
Ho et al.

(10) Patent No.: US 12,277,777 B2
(45) Date of Patent: Apr. 15, 2025

(54) INFORMATION PROCESSING DEVICE AND INFORMATION PROCESSING METHOD

(71) Applicant: SONY GROUP CORPORATION, Tokyo (JP)

(72) Inventors: Hsingying Ho, Tokyo (JP); Christopher Wright, Lausanne (CH); Nicholas Walker, Lausanne (CH); Bernadette Elliot-Bowman, Lausanne (CH)

(73) Assignee: SONY GROUP CORPORATION, Tokyo (JP)

( * ) Notice: Subject to any disclaimer, the term of this patent is extended or adjusted under 35 U.S.C. 154(b) by 179 days.

(21) Appl. No.: 17/998,179

(22) PCT Filed: Apr. 7, 2021

(86) PCT No.: PCT/JP2021/014780
§ 371 (c)(1),
(2) Date: Nov. 8, 2022

(87) PCT Pub. No.: WO2021/235126
PCT Pub. Date: Nov. 25, 2021

(65) Prior Publication Data
US 2023/0298357 A1 Sep. 21, 2023

(30) Foreign Application Priority Data
May 19, 2020 (JP) ................................. 2020-087122

(51) Int. Cl.
*G06V 20/58* (2022.01)
*G06T 7/70* (2017.01)
(Continued)

(52) U.S. Cl.
CPC ................. *G06V 20/58* (2022.01); *G06T 7/70* (2017.01); *G06T 11/00* (2013.01); *G06V 10/764* (2022.01);
(Continued)

(58) Field of Classification Search
CPC ...... G06V 20/58; G06V 10/764; G06V 10/82; G06V 20/17; G06V 10/761; G06T 7/70;
(Continued)

(56) References Cited

U.S. PATENT DOCUMENTS 5,619,616 A * 4/1997 Brady ..................... G01H 3/08
706/20
2012/0300022 A1* 11/2012 Kaneko .............. G08B 13/1672
348/E7.001
(Continued)

FOREIGN PATENT DOCUMENTS

JP 07-057199 A 3/1995
JP H0757199 A * 3/1995
(Continued)

OTHER PUBLICATIONS

JP2014232067A (Machine Translation on Jul. 13, 2024) (Year: 2014).*
(Continued)

*Primary Examiner* — Michael Le
(74) *Attorney, Agent, or Firm* — CHIP LAW GROUP

(57) ABSTRACT

[Problem] The estimation accuracy of a class of an object is to be effectively improved. [Means of Solution] Provided is an information processing device including an estimation unit that estimates, based on an input image, a class of an object that is present in a real environment corresponding to an imaging range of the input image, wherein the object includes an acoustically useful object having an acoustic feature useful for class estimation, and the estimation unit estimates a class of the acoustically useful object based on (Continued)

acoustic data collected from around the acoustically useful object.

16 Claims, 12 Drawing Sheets

(51) Int. Cl.
| | |
|---|---|
| *G06T 11/00* | (2006.01) |
| *G06V 10/764* | (2022.01) |
| *G06V 10/82* | (2022.01) |
| *G06V 20/17* | (2022.01) |
| *H04R 1/08* | (2006.01) |
| *H04R 3/00* | (2006.01) |
| *H04R 23/00* | (2006.01) |

(52) U.S. Cl.
CPC .............. *G06V 10/82* (2022.01); *G06V 20/17* (2022.01); *H04R 1/08* (2013.01); *H04R 3/00* (2013.01); *H04R 23/008* (2013.01); *G06T 2207/10032* (2013.01); *G06T 2207/20084* (2013.01); *G06T 2207/30252* (2013.01)

(58) Field of Classification Search
CPC ........... G06T 11/00; G06T 2207/10032; G06T 2207/20084; G06T 2207/30252; H04R 1/08; H04R 3/00; H04R 23/008; H04N 7/18
See application file for complete search history.

(56) References Cited

U.S. PATENT DOCUMENTS

| | | | |
|---|---|---|---|
| 2014/0119737 A1* | 5/2014 | Bakish | A41D 13/11 |
| | | | 398/133 |
| 2018/0020312 A1* | 1/2018 | Visser | H04S 7/306 |
| 2020/0191613 A1* | 6/2020 | Englund | G08B 13/1672 |
| 2021/0058731 A1* | 2/2021 | Koike | G06F 18/22 |
| 2021/0120333 A1* | 4/2021 | Hirose | H04R 1/40 |
| 2021/0293953 A1* | 9/2021 | Stuart | H04N 23/95 |
| 2022/0101623 A1* | 3/2022 | Walsh | G06F 30/27 |

FOREIGN PATENT DOCUMENTS

| | | | |
|---|---|---|---|
| JP | 09-512339 A | | 12/1997 |
| JP | 2014232067 A | * | 12/2014 |
| JP | 2019-527956 A | | 10/2019 |
| JP | 2019-537721 A | | 12/2019 |

OTHER PUBLICATIONS

JPH0757199A (Machine Translationon Jul. 12, 2024) (Year: 1995).*
International Search Report and Written Opinion of PCT Application No. PCT/JP2021/014780, issued on Jun. 29, 2021, 12 pages of ISRWO.
Oh, et al., "Speech2Face: Learning the Face Behind a Voice", Computer Vision and Pattern Recognition, May 23, 2019, 11 pages.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/014780 filed on Apr. 7, 2021, which claims priority benefit of Japanese Patent Application No. JP 2020-087122 filed in the Japan Patent Office on May 19, 2020. Each of the above-referenced applications is hereby incorporated herein by reference in its entirety.

TECHNICAL FIELD

The present disclosure relates to an information processing device and an information processing method.

BACKGROUND ART

In recent years, many technologies for estimation based on acquired sensor information have been developed. An example of such sensor information is acoustic data. For example, NPL 1 discloses a technology for creating a facial image of a person from acoustic data related to the utterance of the person.

CITATION LIST

Non Patent Literature

[NPL 1]
Tae-Hyun Oh, and five others, "Speech2Face: Learning the Face Behind a Voice", May 23, 2019, [Online], [Search on Apr. 1, 2020], Internet <https://arxiv.org/pdf/1905.09773.pdf>

SUMMARY

Technical Problem

As described in NPL 1, acoustic data has sufficient potential as information used for various types of estimation. Therefore, effective utilization of acoustic data is expected to further improve the performance of various types of estimation tasks.

Solution to Problem

According to one aspect of the present disclosure, an information processing device is provided that includes an estimation unit that estimates, based on an input image, a class of an object that is present in a real environment corresponding to an imaging range of the input image, wherein the object includes an acoustically useful object having an acoustic feature useful for class estimation, and the estimation unit estimates a class of the acoustically useful object based on acoustic data collected from around the acoustically useful object.

According to another aspect of the present disclosure, an information processing method is provided that includes estimating by a processor, based on an input image, a class of an object that is present in a real environment corresponding to an imaging range of the input image, wherein the object includes an acoustically useful object having an acoustic feature useful for class estimation, and the estimating includes estimating a class of the acoustically useful object based on acoustic data collected from around the acoustically useful object.

DESCRIPTION OF EMBODIMENTS

Figure 1:
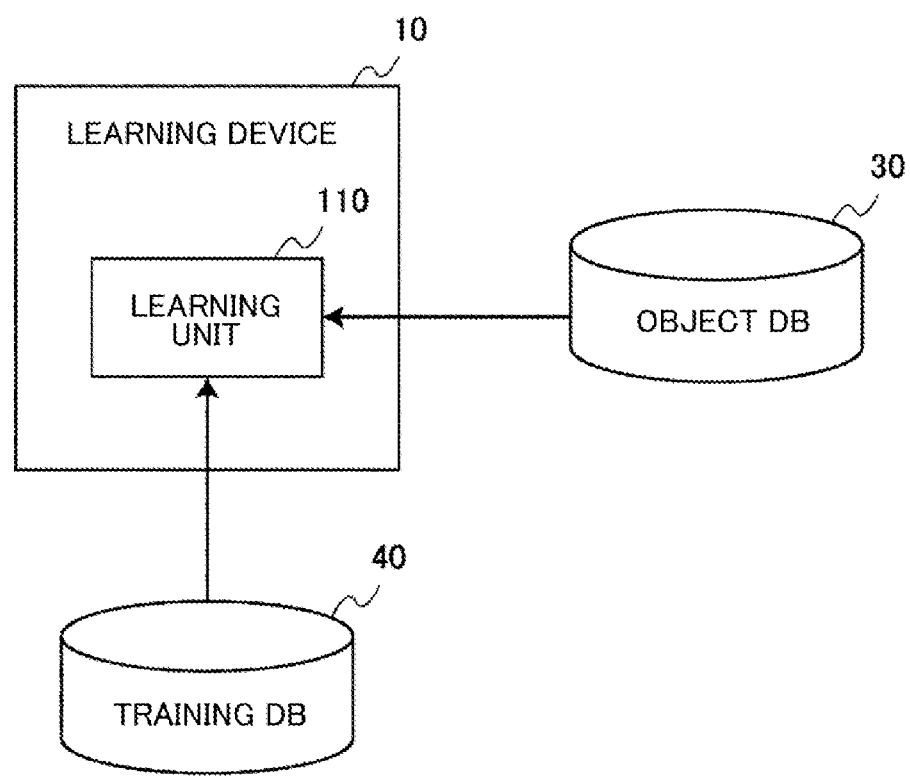
FIG. 1 is a block diagram illustrating a functional configuration example of a learning device according to an embodiment of the present disclosure.

Preferred embodiments of the present disclosure will be described in detail with reference to the accompanying figures below. Also, in the present specification and the figures, components having substantially the same functional configuration will be denoted by the same reference numerals, and thus repeated descriptions thereof will be omitted.

Also, the description will be given in the following order.
1. Embodiment
1.1. Background
1.2. Functional configuration example of learning device 10
1.3. Functional configuration example of estimation device 20
1.4. Estimation details
1.5. Flow of processing
2. Hardware configuration example
3. Conclusion

1. EMBODIMENT

1.1. Background

As described above, in recent years, many technologies for performing estimation based on collected sensor information have been developed. An example of such a technology is a technology of estimating, based on a captured image, the class of an object included as a subject in the image.

For example, assume a case where such a technology is applied to various types of moving objects such as vehicles and drones. In this case, it is possible to automatically estimate various objects such as a person, an animal, and a vehicle based on images captured by an imaging device provided in a moving object. Accordingly, for example, it is possible to perform various types of controls according to the estimation result, such as performing operation control such as avoiding contact between the estimated object and the moving object.

However, in such an image-based estimation technology, the estimation accuracy greatly depends on the quality of the image. For example, when an object appears blurred in an image or when a part of the object is hidden by another object, it may be difficult to correctly estimate the class of the object.

In addition, moving objects such as vehicles and drones are expected to operate in various environments. Therefore, in an environment where sufficient illuminance cannot be secured, for example, at night, it may be difficult to capture an image with sufficient image quality for estimating the class of an object. Further, for example, it may be difficult to capture an image with sufficient image quality even in a foggy situation or a heavy rain or snow situation.

The technical idea according to the present disclosure was conceived by paying attention to the above-mentioned points, and makes it possible to effectively improve the estimation accuracy of the class of an object even in a situation where it is difficult to correctly estimate the class of the object only with an image.

To this end, an estimation device 20 that implements an information processing method according to an embodiment of the present disclosure includes an estimation unit 220 that estimates, based on an input image, the classes of objects that are present in the real environment corresponding to the imaging range of the input image. Here, the above-mentioned objects include acoustically useful objects having acoustic features useful for specifying their class. Further, the estimation unit 220 according to the embodiment of the present disclosure has a feature of estimating the class of an acoustically useful object based on acoustic data collected from around the acoustically useful object.

In other words, the estimation device 20 according to the embodiment of the present disclosure may estimate the class of an acoustically useful object based on acoustic data that reflects the acoustic feature of the acoustically useful object detected based on an input image.

According to the above-mentioned feature, even when the image of an object fails to be captured with sufficient image quality for class estimation, it is possible to greatly improve the possibility of correctly estimating the class by collecting acoustic data from around the object.

Hereinafter, the functional configuration for implementing the above-mentioned feature will be described in detail.

1.2. Functional Configuration Example of Learning Device 10

First, a functional configuration example of a learning device 10 according to an embodiment of the present disclosure will be described. The learning device 10 according to the present embodiment is an information processing device that generates an estimator by performing machine learning using acoustic data related to an acoustically useful object as learning data. The estimator generated by the learning device 10 is used when the estimation device 20 performs class estimation of an acoustically useful object.

FIG. 1 is a block diagram illustrating the functional configuration example of the learning device 10 according to the embodiment of the present disclosure. As illustrated in FIG. 1, the learning device 10 according to the present embodiment includes at least a learning unit 110.

(Learning Unit 110)

The learning unit 110 according to the present embodiment generates the estimator by performing machine learning using acoustic data related to acoustically useful objects as learning data. The learning unit 110 according to the present embodiment may perform the above-mentioned learning by a method such as Deep Learning.

The learning unit 110 according to the present embodiment performs the learning as described above by using information related to acoustically useful objects stored in an object DB 30 and various types of data stored in a training DB 40. Details of learning performed by the learning unit 110 will be described later.

(Object DB 30)

The object DB 30 according to the present embodiment is a database for storing information related to acoustically useful objects. In the object DB 30, for example, fields such as [Application Type], [Useful Object Classes], and [Features of Useful Object Classes] may be defined.

[Application Type] may be a field indicating the type of application for which estimation is performed by the estimation device 20. Since the classes of the acoustic usefulness object according to the present embodiment vary greatly depending on applications, expected types of application may be defined for that field. In [Application Type], data such as [for drones] and [for vehicles], for example, is stored.

[Useful Object Classes] may be a field that defines the class of an acoustically useful object for each application. In [Useful Object Classes], data such as [Class #0 car], [Class #1 human], [Class #2 drone], [Class #3 animals], [Class #4 unknown object], and [Class #5 background], for example, is stored.

[Features of Useful Object Classes] may be a field for storing images and features of each acoustically useful object. Such features include, for example, a higher abstraction level image that is easier for a neural network to process than a human-understandable original image. Images and features stored in [Features of Useful Object Classes] are used for similarity comparison for an object in an input image in detecting an acoustically useful object.

(Training DB 40)

The training DB 40 according to the present embodiment is a database that stores various types of data used when the learning device 10 performs learning. In the training DB 40, for example, fields such as [Application Type], [Video Data Segments of Useful Objects], [Position of the microphone relative to the camera], and [Microphone recording parameters] may be defined.

This [Application Type] may be the same as [Application Type] of the object DB 30, and thus, detailed description thereof will be omitted.

[Video Data Segments of Useful Objects] may be a field for storing video data related to the application. For example, if the application is for drones, the video data may be an aerial video taken by a drone, and if the application is for vehicles, the video data may be a video in front of a vehicle taken by an in-vehicle camera.

In each piece of video data, an acoustically useful object appearing as a subject is explicitly defined (for example, by a rectangle and a tag, etc.), and acoustic data collected from the acoustically useful object is also stored.

[Position of the microphone relative to the camera] may be a field for storing the relative position of the microphone that collected the acoustic data to the camera that took the video data.

[Microphone recording parameters] may be a field for storing the parameters (sound collection parameters) used when the microphone collected sound.

The relative position between the microphone and the camera and the sound collection parameters may be used as learning data together with the acoustic data as factors that affect the sound collection position of the acoustic data and the characteristics of the acoustic data to be collected.

The functional configuration example of the learning device 10 and the data structure examples of the object DB 30 and the training DB 40 according to the present embodiment have been described above. Note that the above-described examples are just examples, and the functional configuration of the learning device 10 and the data structures of the object DB 30 and the training DB 40 according to the present embodiment are not limited to the above-described examples. For example, the learning device 10 may further include an operation unit that receives user operations, a display unit that displays various types of information, and the like. The functional configuration of the learning device 10 and the data structures of the object DB 30 and the training DB 40 according to the present embodiment can be flexibly modified according to specifications and operations.

1.3. Functional Configuration Example of Estimation Device 20

Next, a functional configuration example of the estimation device 20 according to an embodiment of the present disclosure will be described. The estimation device 20 according to the present embodiment is an example of an information processing device that estimates a class of an acoustically useful object by using an estimator generated by the learning device 10. The estimation device 20 according to the present embodiment may be mounted on various types of moving objects such as a vehicle and a drone, for example.

Figure 2:
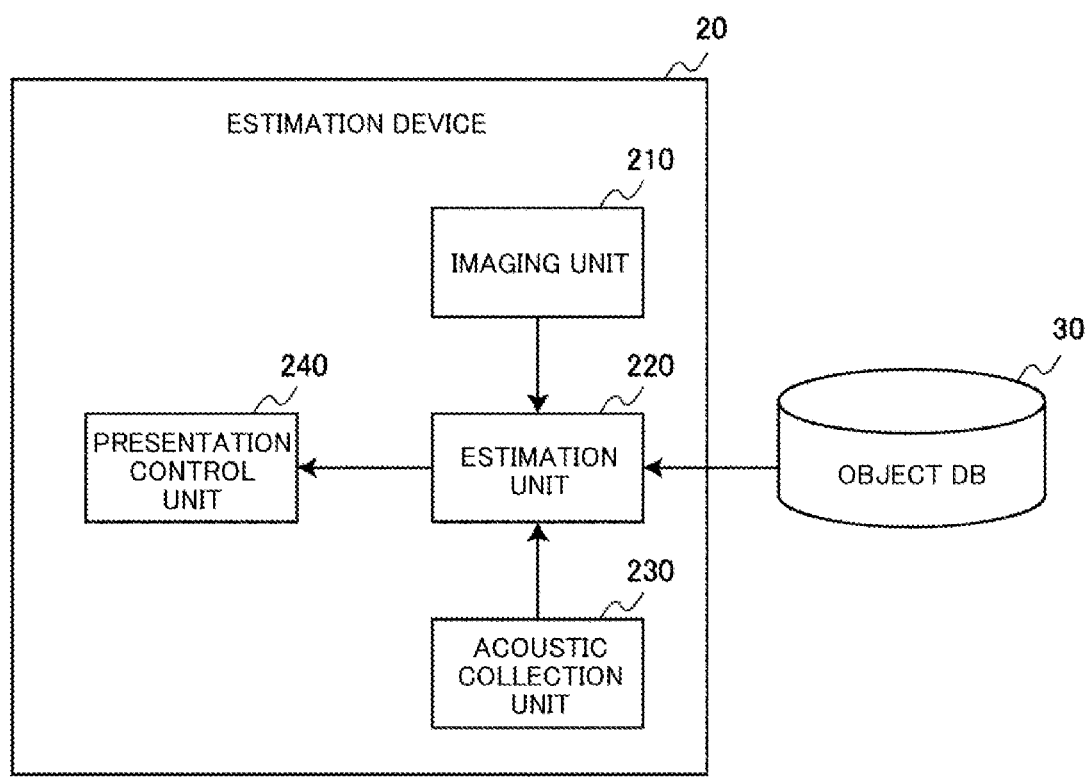
FIG. 2 is a block diagram illustrating a functional configuration example of an estimation device according to the embodiment.

FIG. 2 is a block diagram illustrating the functional configuration example of the estimation device 20 according to the embodiment. As illustrated in FIG. 2, the estimation device 20 according to the present embodiment may include an imaging unit 210, the estimation unit 220, an acoustic collection unit 230, and a presentation control unit 240.

(Imaging Unit 210)

The imaging unit 210 according to the present embodiment captures an image (input image) used when the estimation unit 220 performs estimation. Specifically, the imaging unit 210 according to the present embodiment includes, for example, an imaging device such as an RGB camera. The imaging unit 210 may also include a ToF camera, LIDAR, or the like to acquire depth information.

(Estimating Unit 220)

The estimation unit 220 according to the present embodiment estimates, based on images (input images) captured by the imaging unit 210, the classes of objects that are present in the real environment corresponding to the imaging range of the input image. As described above, the objects include acoustically useful objects having acoustic features useful for specifying their class. Further, the estimation unit 220 according to the present embodiment has a feature of estimating the class of an acoustically useful object based on acoustic data collected from around the acoustically useful object.

The functions of the estimation unit 220 according to the present embodiment is implemented by various types of processors. Details of the functions of the estimation unit 220 according to the present embodiment will be described later.

(Acoustic Collection Unit 230)

The acoustic collection unit 230 according to the present embodiment collects acoustic data from around an acoustically useful object under the control of the estimation unit 220. Specifically, the acoustic collection unit 230 according to the present embodiment includes a sound collection device having directivity.

The sound collection device includes, for example, a laser microphone, LIDAR, or the like, which collects acoustic data by utilizing a change in optical vibration accompanied by the vibration of particles in the air.

For example, LIDAR can be used as a virtual microphone that can set any position in a three-dimensional space as a sound collection position. More specifically, by adjusting the position and orientation of a configuration for emitting a signal beam and a sensor configuration for receiving a received beam, the position at which the virtual microphone collects sound can be controlled, where a probe volume is defined as the intersection of the received beam (the beam reflected by a local oscillator and received by the sensor configuration) and the signal beam.

(Presentation Control Unit 240)

The presentation control unit 240 according to the present embodiment controls the presentation of information related to the result of estimation by the estimation unit 220. The presentation control unit 240 according to the present embodiment may control the presentation of information related to the classes of acoustically useful objects estimated by the estimation unit 220, for example. The presentation control unit 240 may perform control such as displaying information related to the classes of acoustically useful objects on a separate display device.

The functional configuration example of the estimation device 20 according to the embodiment of the present disclosure has been described above. The configuration described above with reference to FIG. 2 is just an example, and the functional configuration of the estimation device 20 according to the present embodiment is not limited to such an example. The functional configuration of the estimation device 20 according to the present embodiment can be flexibly modified according to specifications and operations.

1.4. Estimation Details

Next, the class estimation of objects by the estimation device 20 according to the present embodiment will be described in detail. The class estimation of an object by the estimation device 20 according to the present embodiment may be designed as appropriate depending on the type of application to be applied. Accordingly, in the following, the applications to which the estimation device 20 is applied and the functions provided by the estimation device 20 will be described with some specific examples.

First, an example will be described in which the estimation device 20 creates a composite image visually showing the estimated acoustically useful objects and controls the presentation of the composite image to the user.

Figure 3A:
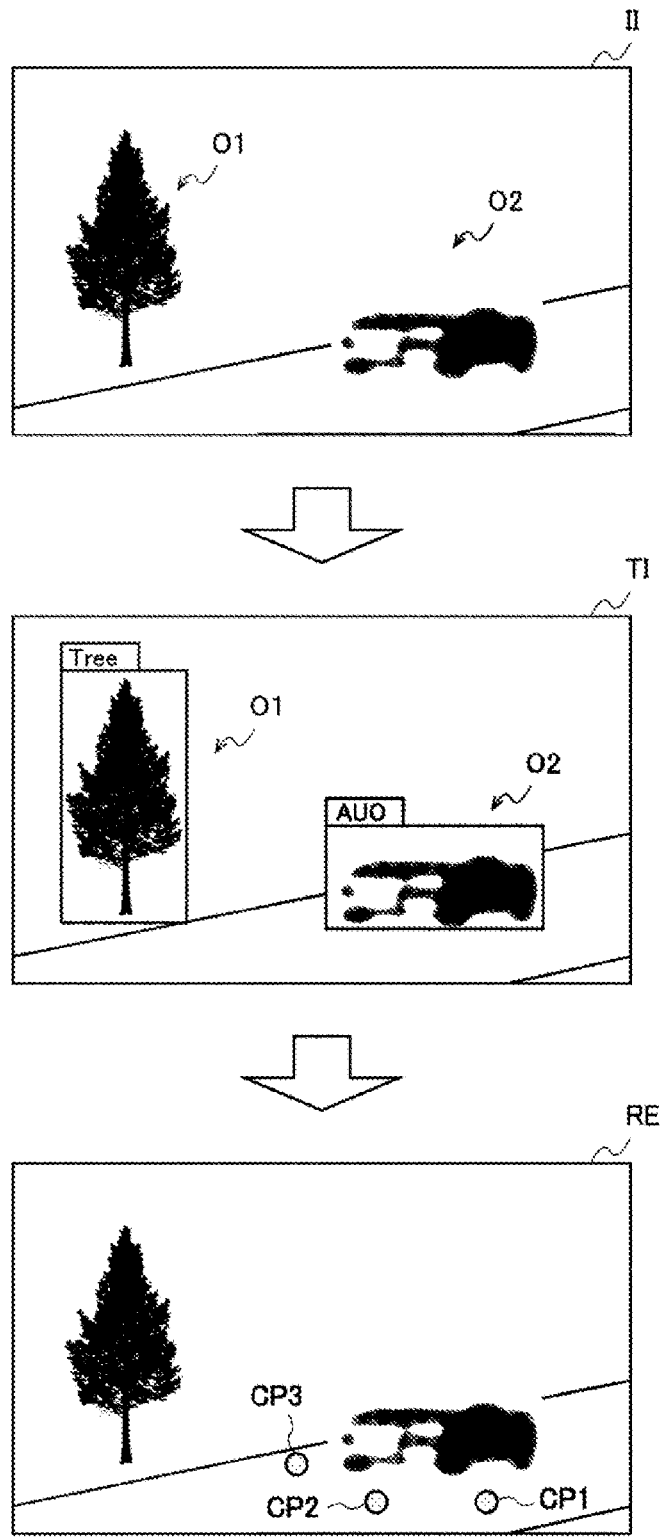
FIG. 3A is a diagram for describing an example of a composite image visually showing acoustically useful objects, which is created by the estimation device according to the embodiment.
Figure 3B:
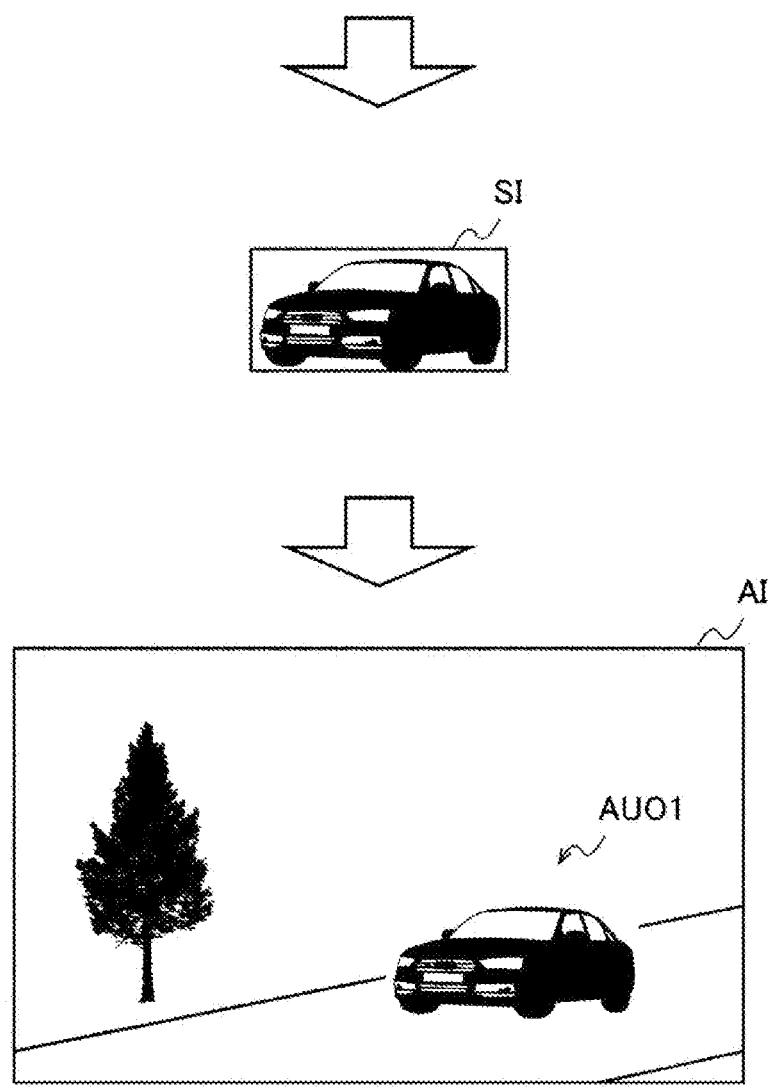
FIG. 3B is a diagram for describing the example of the composite image visually showing the acoustically useful objects, which is created by the estimation device according to the embodiment.

FIGS. 3A and 3B are diagrams for describing the example of the composite image visually showing the acoustically useful objects, which is created by the estimation device 20 according to the embodiment. Note that FIGS. 3A and 3B illustrate the example in the case where the estimation device 20 is mounted on a vehicle.

The upper part in FIG. 3A illustrates an input image II captured by the imaging unit 210. The input image II includes two objects O1 and O2 as subjects. In the present example, it is assumed that the object O1 appears clear, while the object O2 appears blurred.

The estimation unit 220 according to the present embodiment estimates the class of each object based on the input image II as described above. In this estimation, the estimation unit 220 according to the present embodiment may refer to the object DB 30 as well as a general object recognition DB.

The middle part in FIG. 3A illustrates a tagged image TI tagged with the result of the above-described estimation by the estimation unit 220. In the present example, the object O1 is estimated as [Tree] and the object O2 is estimated as [AUO (Acoustically Useful Object)]. The tagged image TI is an example for convenience of explanation, and may not necessarily be output.

As described above, even when the object does not appear clear, the estimation unit 220 according to the present embodiment can estimate the object as an acoustically useful object by referring to the object DB 30.

Next, as illustrated in the lower part in FIG. 3A, the estimation unit 220 according to the present embodiment controls the acoustic collection unit 230 to collect acoustic data from around the estimated acoustically useful object AUO1 (=object O2) in a real environment RE.

For example, the estimation unit 220 according to the present embodiment may estimate the position of the acoustically useful object AUO1 in the real environment RE and determine at least one sound collection position according to the estimated position. In addition, the estimation unit 220 may control the acoustic collection unit 230 so that acoustic data is collected at the determined sound collection position.

In the case of the example illustrated in the lower part in FIG. 3A, the estimation unit 220 controls the acoustic collection unit 230 to collect pieces of acoustic data related to the acoustically useful object AUO1 at three sound collection positions CP1 to CP3.

In this collection, the estimation unit 220 may determine sound collection positions and sound collection parameters based on a predetermined standard setting, or may determine more effective sound collection positions and sound collection parameters based on the estimated class of the acoustically useful object AUO1.

For example, if the class of the acoustically useful object AUO1 is successfully estimated as [Class #0 car] at the time of the middle part in FIG. 3A, the estimation unit 220 can refer to, for example, a lookup table to determine sound collection positions (for example, the vicinity of components that emit sound such as the engine and tires) and sound collection parameters, which are effective for [Class #0 car]. The sound collection positions and the sound collection parameters suitable for each class of the acoustically useful object AUO1 may be determined from the relative position between the microphone and the camera and the sound collection parameters, which are stored in the training DB 40.

On the other hand, if the class of the acoustically useful object AUO1 is successfully estimated as [Class #4 unknown object] at the time of the middle part in FIG. 3A, the estimation unit 220 may determine sound collection positions (for example, a distance of 20 cm above the acoustically useful object AUO1) and sound collection parameters, based on the above-mentioned standard setting.

In addition, the estimation unit 220 according to the present embodiment may estimate the class of the acoustically useful object AUO1 and, as illustrated in the upper part in FIG. 3B, create a composite image SI visually showing the acoustically useful object AUO1.

In this case, the estimation unit 220 according to the present embodiment may create a superimposed image AI in which the created composite image SI is superimposed on the input image II, as illustrated in the lower part in FIG. 3B. For the creation of the superimposed image AI, for example, a method such as normalized averaging of pixel values, principal component analysis, wavelet transform, or pairwise spatial frequency matching may be used. The superimposed image AI may be controlled to be presented to the user by the presentation control unit 240.

As described above, even when an object does not appear clear in the input image II, the estimation device 20 according to the present embodiment estimates the object as an acoustically useful object, so that it is possible to present a high resolution image that visually shows the acoustically useful object.

Figure 4:
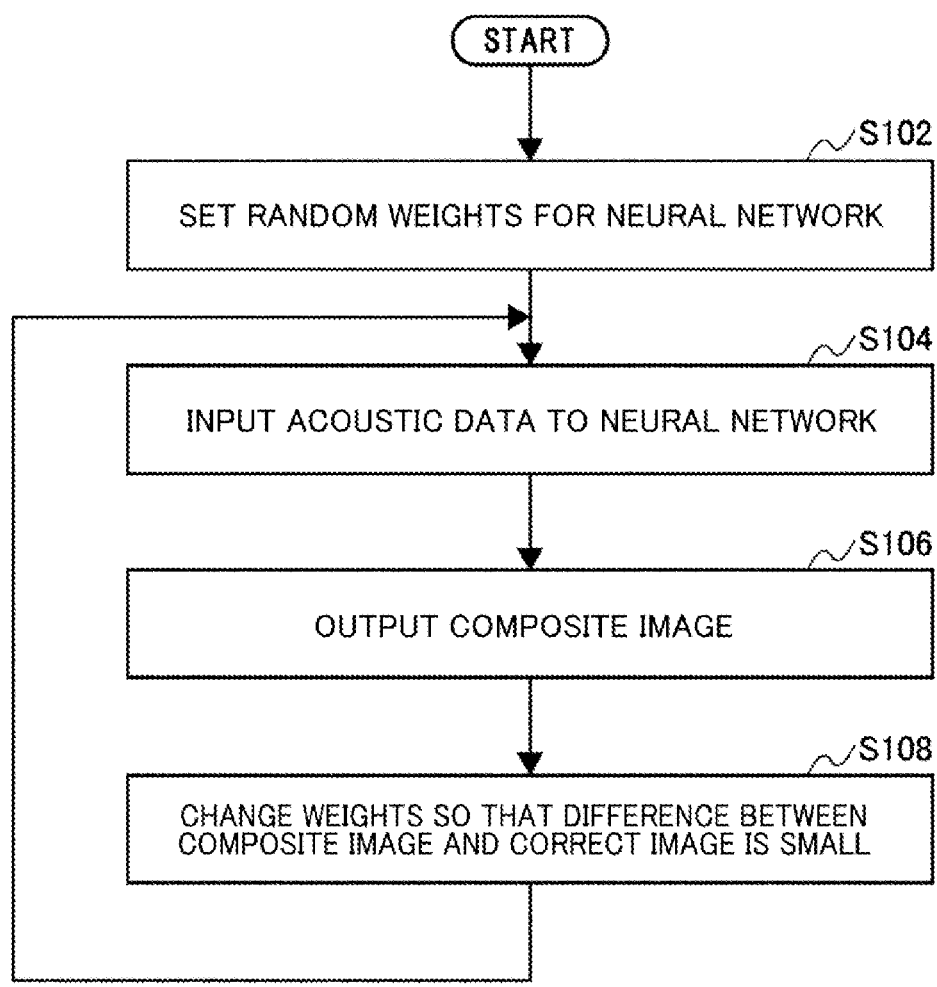
FIG. 4 is a flowchart illustrating a flow of learning for creating a composite image, according to the embodiment.

Now, a learning method for creating the composite image SI as described above will be described. FIG. 4 is a flowchart illustrating a flow of learning for creating a composite image, according to the embodiment.

First, the learning unit 110 sets random weights for a neural network (S102).

Next, the acoustic data associated with the video data stored in the training DB 40 is input to the neural network (S104).

Next, the neural network outputs a composite image based on the acoustic data input in step S104 (S106).

Next, the weights are updated so that the difference between the composite image output in step S106 and the correct image is small (S108). Here, the correct image may be video data associated with the acoustic data input in step S104.

The learning unit 110 repeatedly executes the above-mentioned steps S104 to S108 a predetermined number of times. After that, when the test data is found for which the similarity between the composite image output from the neural network and the correct image satisfies a specified condition, the generated estimator is applied to the estimation unit 220 of the estimation device 20.

As described above, the estimation unit 220 according to the present embodiment can create a composite image by using the estimator generated by machine learning in which acoustic data related to the acoustically useful object is input and an image related to the acoustically useful object is output.

More specifically, it can be said that the estimator is generated by machine learning to reduce the difference between the image output from the neural network and the image of an acoustically useful object captured at the same time as the acoustic data to be input to the neural network.

As described above, even when an object does not appear clear in the input image II, the estimation device 40 according to the present embodiment estimates the object as an acoustically useful object, so that it is possible to estimate its class and sharpen the image.

In addition, even for an object (such as the above-mentioned [Class #4 unknown object]) whose class is difficult to estimate based on the pixels in the input image II, the estimation device 40 according to the present embodiment can estimate the class.

The case has been exemplified above in which the acoustic collection unit 230 collects acoustic data actively emitted by an acoustically useful object (for example, an engine sound or a sound generated by the rotation of a tire), and the estimation unit 220 estimates the class of the acoustically useful object and creates a composite image based on the acoustic data.

On the other hand, the acoustic collection unit 230 according to the present embodiment may output a predetermined acoustic signal for an acoustically useful object and collect acoustic data related to the reflected sound reflected by the acoustically useful object.

Figure 5:
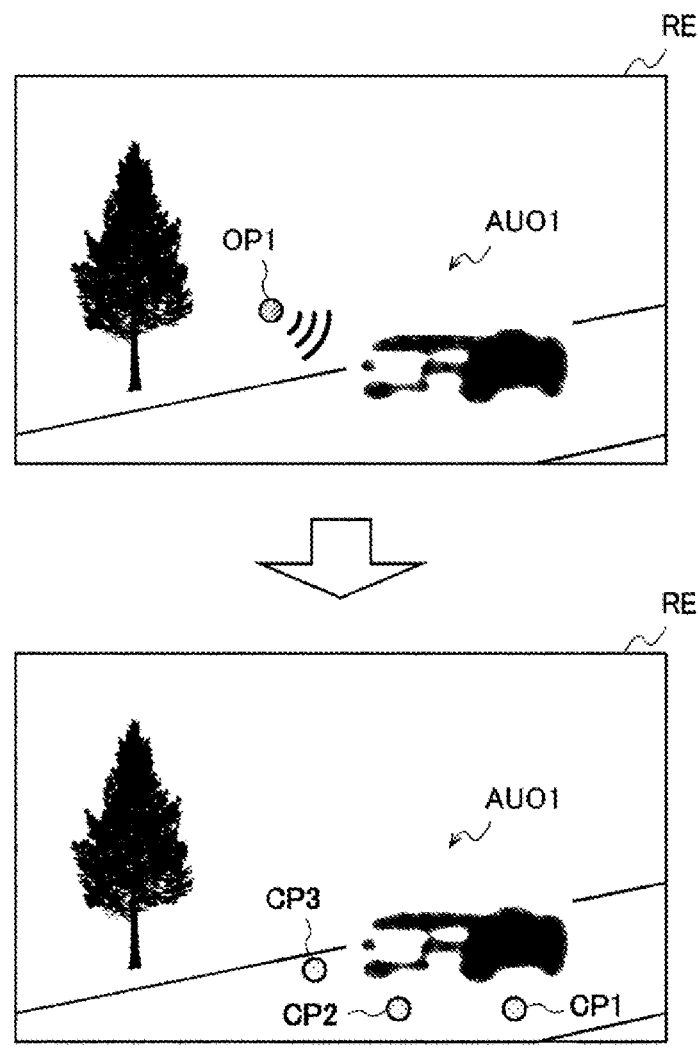
FIG. 5 is a diagram for describing the collection of acoustic data related to a reflected sound, according to the embodiment.

FIG. 5 is a diagram for describing the collection of acoustic data related to a reflected sound, according to the present embodiment. As illustrated in the upper part in FIG. 5, the estimation unit 220 according to the present embodiment determines at least one output position according to the estimated position of the acoustically useful object AUO1 in the real environment RE, and causes the acoustic collection unit 230 to output an acoustic signal for the acoustically useful object AUO1 at the output position. In the case of the example illustrated in the upper part in FIG. 5, the estimation unit 220 determines one output position OP1 and causes the acoustic collection unit 230 to output an acoustic signal.

The estimation unit 220 may determine an output position based on a predetermined standard setting, or may determine a more effective output position based on the estimated class of the acoustically useful object AUO1.

The acoustic collection unit 230 can generate an acoustic signal with an output level that does not affect the human eye or the like, for example, based on the interaction between the water molecule in the air and a laser beam (photoacoustic effect using the laser beam adjusted to the absorption spectrum of the water molecule). The acoustic collection unit 230 can also operate as a virtual speaker that outputs an acoustic signal at an output position determined by sweeping the laser beam at the speed of sound.

In addition, for example, the acoustic collection unit 230 may cause frequency interference by crossing a plurality of audible ultrasonic beams and output an acoustic signal. In this case, the acoustic collection unit 230 can output an acoustic signal at a determined output position by adjusting the intersection of the plurality of audible ultrasonic beams.

Subsequently, the estimation unit 220 controls the acoustic collection unit 230 so that pieces of acoustic data related to the reflected sound reflected by the acoustically useful object AUO1 are collected at determined sound collection positions. In the case of the example illustrated in the lower part in FIG. 5, the estimation unit 220 performs a control to collect pieces of acoustic data related to the reflected sound at three sound collection positions CP1 to CP3.

According to the control as described above, even if an acoustically useful object does not actively emit sound or an acoustically useful object actively emits a small sound, it is possible to estimate the class of the acoustically useful object and create a composite image based on the acoustic characteristics of reflected sound different depending on each acoustically useful object.

Next, an example will be described in which the estimation device 20 according to the present embodiment does not create a composite image related to an acoustically useful object. The case has been exemplified above in which the estimation device 20 according to the present embodiment creates a composite image related to an acoustically useful object based on the collected acoustic data, and also creates a superimposed image in which the composite image is superimposed on the input image.

On the other hand, the creation of a composite image and a superimposed image is just an example, and the estimation device 20 may not necessarily create the composite image or the superimposed image. Even in this case, the result of class estimation of the acoustically useful object based on acoustic data can be usefully utilized.

Figure 6:
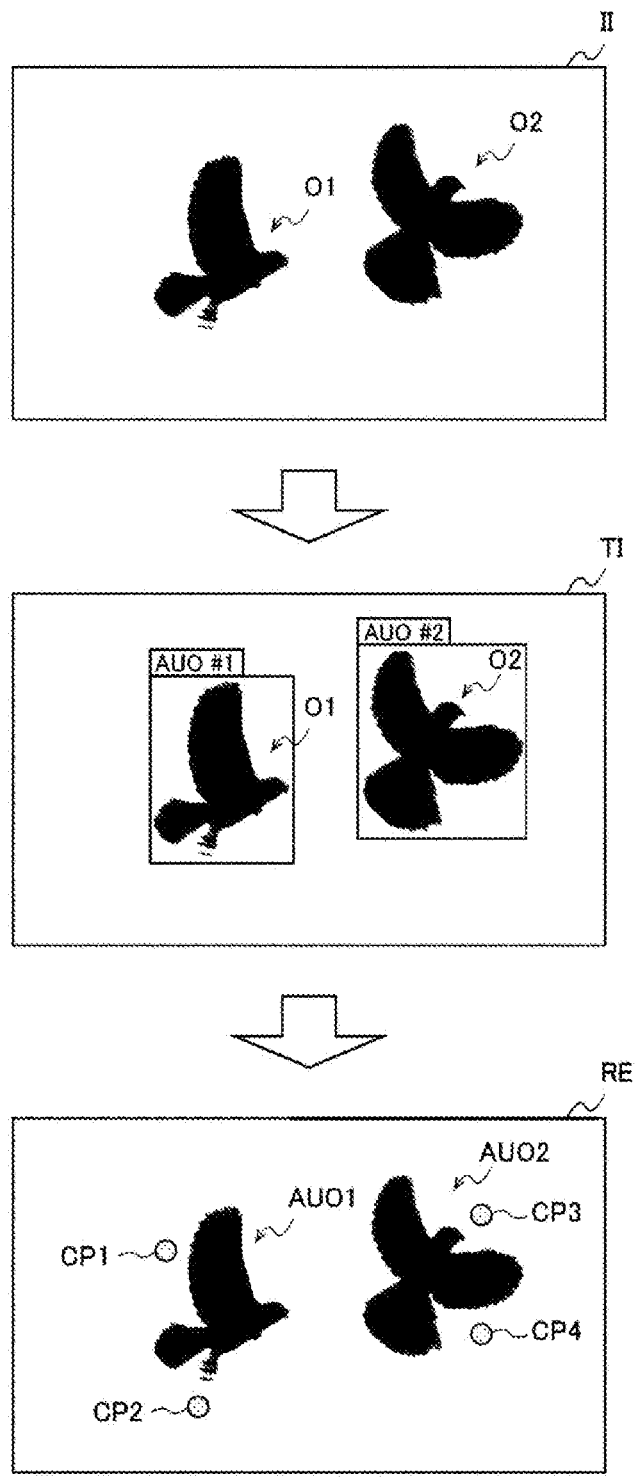
FIG. 6 is a diagram illustrating an example of class estimation of acoustically useful objects in the case where the estimation device according to the embodiment is mounted on a drone.

FIG. 6 is a diagram illustrating an example of class estimation of acoustically useful objects in the case where the estimation device 20 according to the present embodiment is mounted on a drone.

The upper part in FIG. 6 illustrates an input image II captured by the imaging unit 210. The input image II includes two objects O1 and O2 as subjects. In the present example, it is assumed that both the objects O1 and O2 appear unclear. The input image II may be, for example, an image captured at night or an image captured in fog.

The estimation unit 220 according to the present embodiment estimates the class of each object based on the input image II as described above. In this estimation, the estimation unit 220 according to the present embodiment may refer to the object DB 30 as well as a general object recognition DB.

The middle part in FIG. 6 illustrates a tagged image TI tagged with the result of the above-described estimation by the estimation unit 220. In the present example, both the objects O1 and O2 are estimated as [AUO (Acoustically Useful Object)]. The tagged image TI is an example for convenience of explanation, and may not necessarily be output.

Next, as illustrated in the lower part in FIG. 6, the estimation unit 220 according to the present embodiment controls the acoustic collection unit 230 to collect acoustic data from around an estimated acoustically useful object AUO1 (=object O1) and an estimated acoustically useful object AUO2 (=object O2) in a real environment RE.

In the case of the example illustrated in the lower part in FIG. 6, the estimation unit 220 controls the acoustic collection unit 230 so that the acoustic data related to the acoustically useful object AUO1 is collected at sound collection positions CP1 and CP2, and the acoustic data related to the acoustically useful object AUO2 is collected at sound collection positions CP3 and CP4.

Subsequently, the estimation unit 220 can estimate the classes of the acoustically useful objects AUO1 and AUO2 as birds based on the collected acoustic data. In addition, the estimation unit 220 according to the present embodiment continuously can perform the above-described estimation on the input image II input in the time series, so that not only the classes of the acoustically useful objects AUO1 and AUO2 but also the traveling directions of the acoustically useful objects AUO1 and AUO2 can be estimated.

The classes and traveling directions of the acoustically useful objects AUO1 and AUO2 estimated as described above may be used, for example, for aircraft control of a drone on which the estimation device 20 is mounted.

Figure 7:
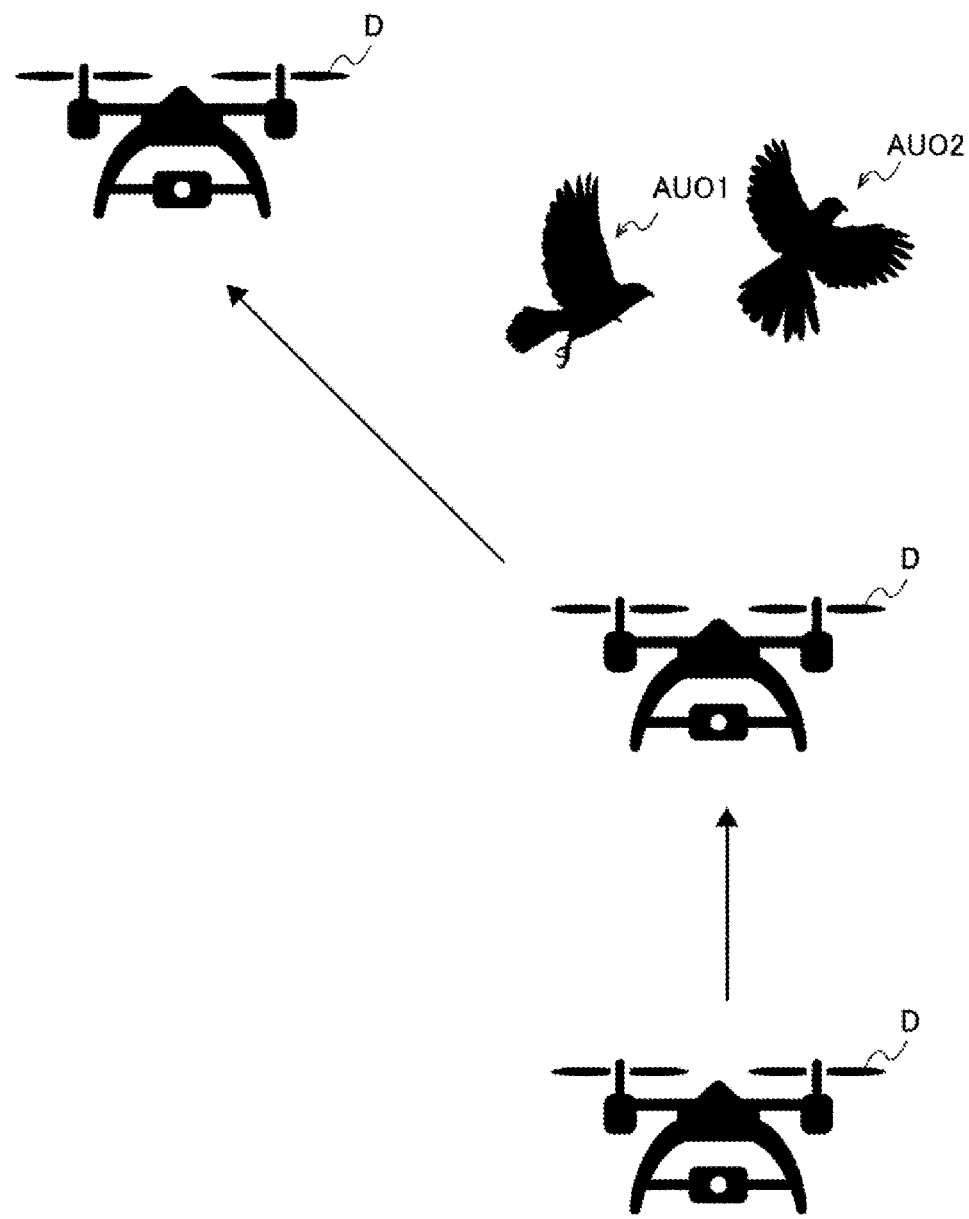
FIG. 7 is a diagram for describing a control example of a moving object based on results of class estimation of acoustically useful objects, according to the embodiment.

FIG. 7 is a diagram for describing a control example of a moving object based on results of class estimation of acoustically useful objects, according to the present embodiment.

FIG. 7 illustrates traveling paths of a drone D on which the estimation device 20 is mounted. For example, as illustrated in FIG. 7, it is assumed that, when the drone D travels from the lower part in FIG. 7 to the upper part in FIG. 7, the classes of the acoustically useful objects AUO1 and AUO2 are estimated as birds as illustrated in FIG. 6, and the traveling directions of the acoustically useful objects AUO1 and AUO2 are estimated as the right direction in FIG. 7.

In this case, the drone M may change its course, for example diagonally to the left in FIG. 7, to avoid contact with the acoustically useful objects AUO1 and AUO2 based on the class estimation result described above.

As described above, the estimation device 20 according to the present embodiment may not necessarily create a composite image or the like. Further, the estimation result by the estimation device 20 may not necessarily be presented to the user. Even in this case, various effects can be obtained by using the estimation result for controlling a moving object such as a drone or a vehicle. The moving object may be controlled by the estimation unit 220 based on the estimation result.

In the case where the estimation device 20 does not create a composite image related to an acoustically useful object, the learning device 10 can generate an estimator by simpler learning.

Figure 8:
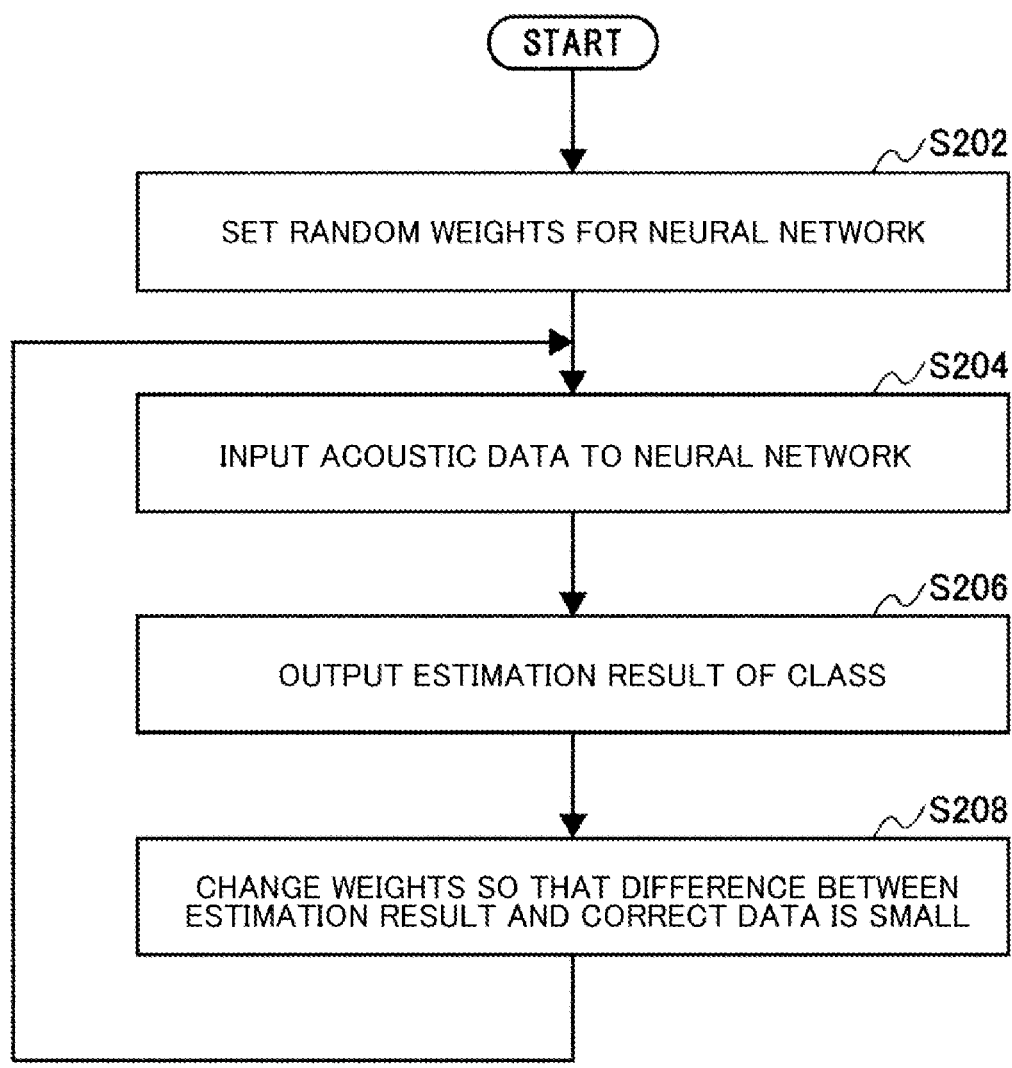
FIG. 8 is a flowchart illustrating a flow of learning for the case where a composite image is not created, according to the embodiment.

FIG. 8 is a flowchart illustrating a flow of learning for the case where a composite image is not created, according to the present embodiment.

Even in the case where a composite image is not created, random weights are first set for a neural network as in the case where a composite image is created (S202).

Next, the acoustic data associated with the video data stored in the training DB 40 is input to the neural network (S204).

Next, the neural network outputs the estimation result of the class based on the acoustic data input in step S204 (S206). The above estimation result may include estimated classes and certainties of the classes, such as "bird (90%)" and "drone (10%)".

Next, the weights are updated so that the difference between the estimation result of the class output in step S206 and the correct data is small (S208). The above correct data may be, for example, a certainty of 100% for one class and a certainty of 0% for the other class, such as "bird (100%)" and "drone (0%)".

As described above, in the case where the estimation device 20 does not create a composite image related to an acoustically useful object, the learning device 10 can more easily generate an estimator by a method such as general supervised learning.

Next, an example will be described in which the estimation device 20 according to the present embodiment estimates the class of an acoustically useful object that does not appear as a subject in an input image. The case has been described above in which the estimation device 20 according to the present embodiment estimates the class of an acoustically useful object that appears as a subject in an input image. On the other hand, an acoustically useful object according to the present embodiment may be an object in a real environment that does not appear as a subject in an input image.

Figure 9:
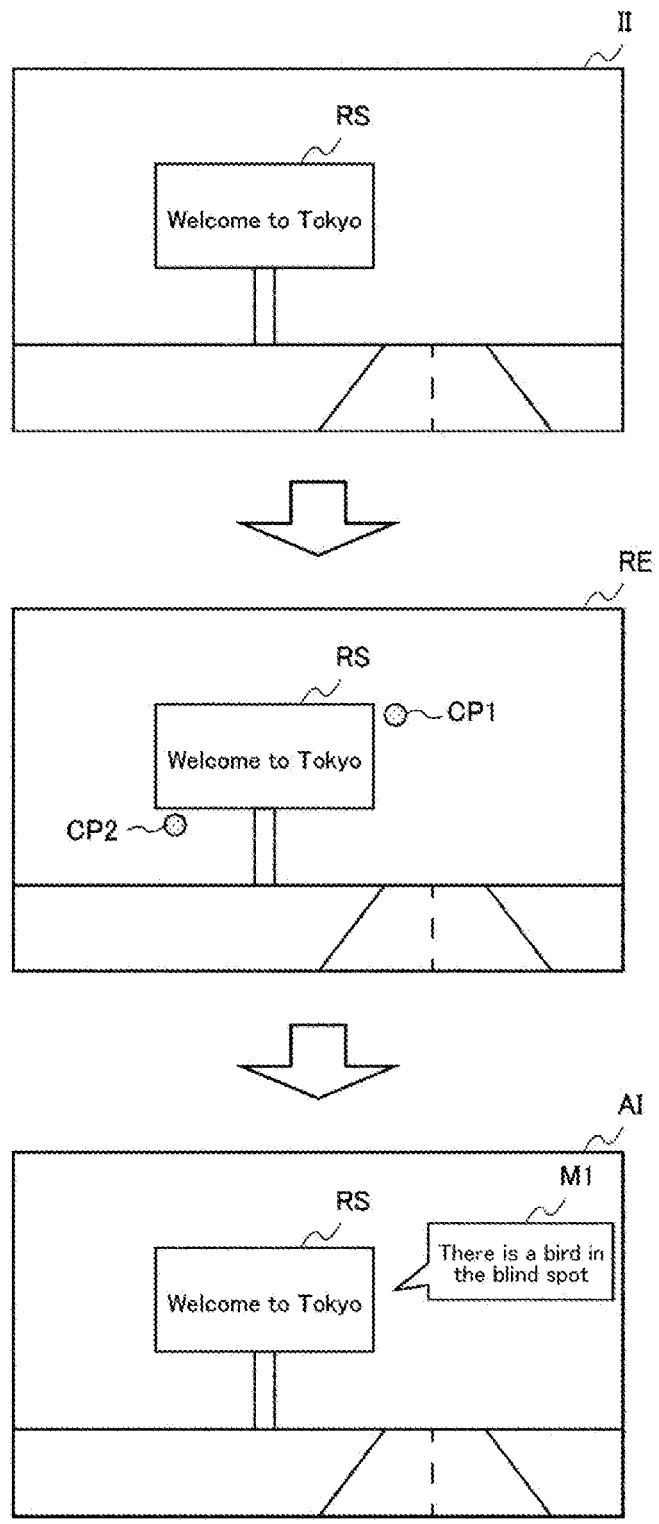
FIG. 9 is a diagram for describing class estimation of an acoustically useful object that does not appear as a subject in an input image, according to the embodiment.

FIG. 9 is a diagram for describing class estimation of an acoustically useful object that does not appear as a subject in an input image, according to the present embodiment.

The upper part in FIG. 9 illustrates an input image II captured by the imaging unit 210. It is assumed that, in the input image II, an acoustically useful object does not appear as a subject, but a road sign RS appears as a subject.

In this case, the back side of the road sign RS is a blind spot for a moving object such as a drone on which the estimation device 20 is mounted. Thus, the estimation unit 220 according to the present embodiment may control the acoustic collection unit 230 to collect acoustic data in consideration of the possibility that an acoustically useful object is present in such a blind spot.

In other words, the estimation unit 220 according to the present embodiment may determine at least one sound collection position according to a position where an acoustically useful object may be present in the real environment, which is estimated based on the input image, and then estimate the class of the acoustically useful object based on acoustic data collected at the sound collection position.

For example, as illustrated in the middle part in FIG. 9, the estimation unit 220 may estimate the possibility that an acoustically useful object is present on the back side (blind spot) of the road sign RS, set sound collection positions CP1 and CP2 in the vicinity of the road sign RS, and cause the acoustic collection unit 230 to collect acoustic data.

According to the control as described above, when an acoustically useful object is present on the back side of the road sign RS, it is possible to estimate the class of the acoustically useful object.

Further, if the class of the acoustically useful object present on the back side of the road sign RS is successfully estimated, the presentation control unit 240 may perform, based on the estimation result, a control for presenting a message M1 such as "There is a bird in the blind spot" to the user, for example. According to such a control, attention can be drawn to the user who controls the moving object.

The class estimation of an acoustically useful object that does not appear as a subject in the input image, according to the present embodiment has been described above. The estimation unit 220 according to the present embodiment can perform the control as described above by using an estimator that has learned about the estimation of a blind spot. In this case, the learning device 10 may perform learning for, for example, estimating a static object such as a road signboard, real estate, or the vicinity of an intersection as a blind spot.

1.5. Flow of Processing

Figure 10:
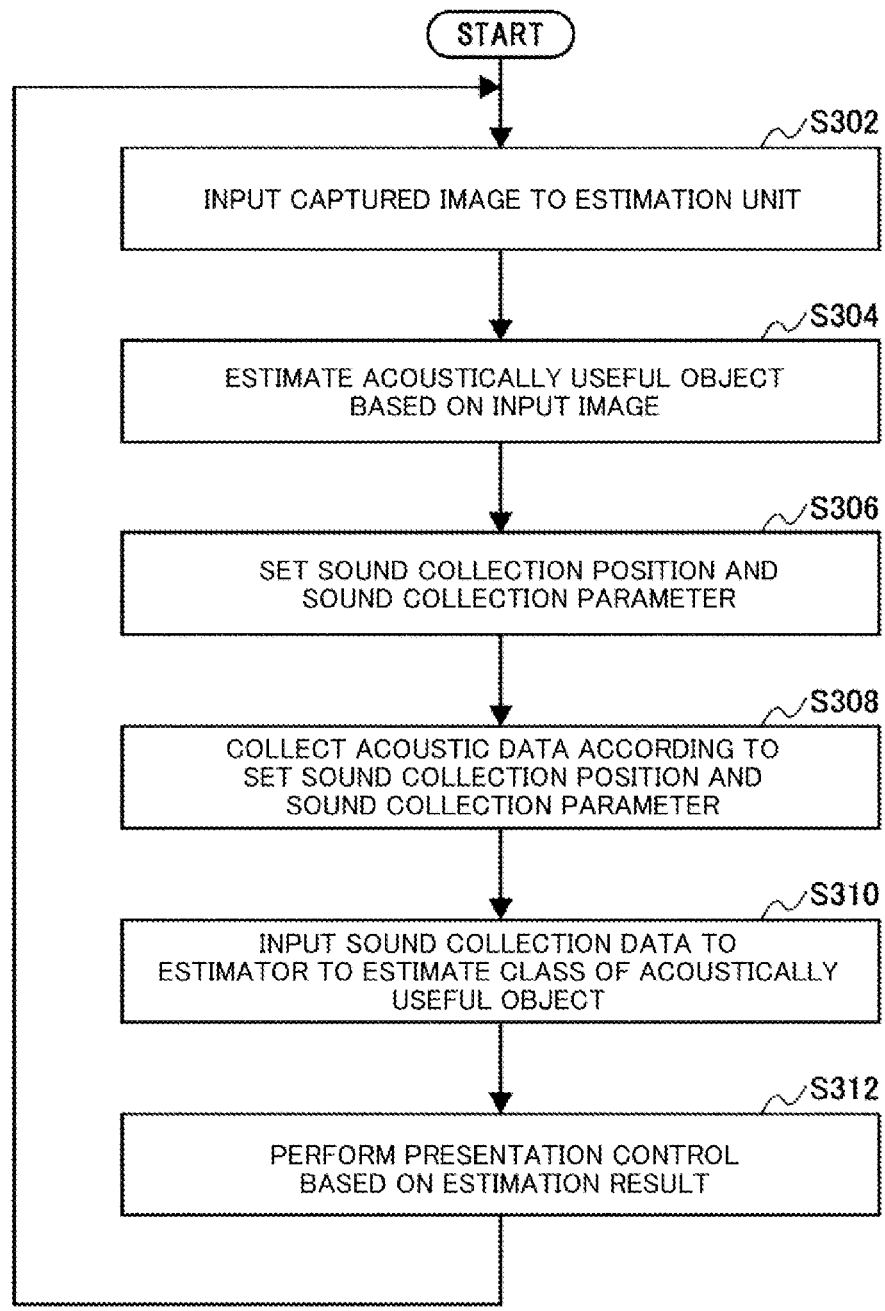
FIG. 10 is a flowchart illustrating a flow of processing of the estimation device according to the embodiment.

Next, a flow of processing of the estimation device 20 common to the above-described examples will be described in detail. FIG. 10 is a flowchart illustrating the flow of processing of the estimation device 20 according to the present embodiment.

As illustrated in FIG. 10, first, the imaging unit 210 captures an image and inputs it to the estimation unit 220 (S302).

Next, the estimation unit 220 estimates an acoustically useful object based on the input image input in step S302 (S304).

Subsequently, the estimation unit 220 sets a sound collection position and a sound collection parameter depending on the acoustically useful object estimated in step S304 (S306).

Next, the acoustic collection unit 230 collects acoustic data related to the acoustically useful object according to the sound collection position and the sound collection parameter set in step S306 (S308).

Next, the estimation unit 220 inputs the acoustic data collected in step S308 to the estimator to estimate the class of the acoustically useful object (S310).

Next, the presentation control unit 240 performs presentation control based on the estimation result in step S310 (S312).

The estimation device 20 according to the present embodiment may repeatedly execute the processing of steps S302 to S312 until a stop command is received.

2. HARDWARE CONFIGURATION EXAMPLE

Figure 11:
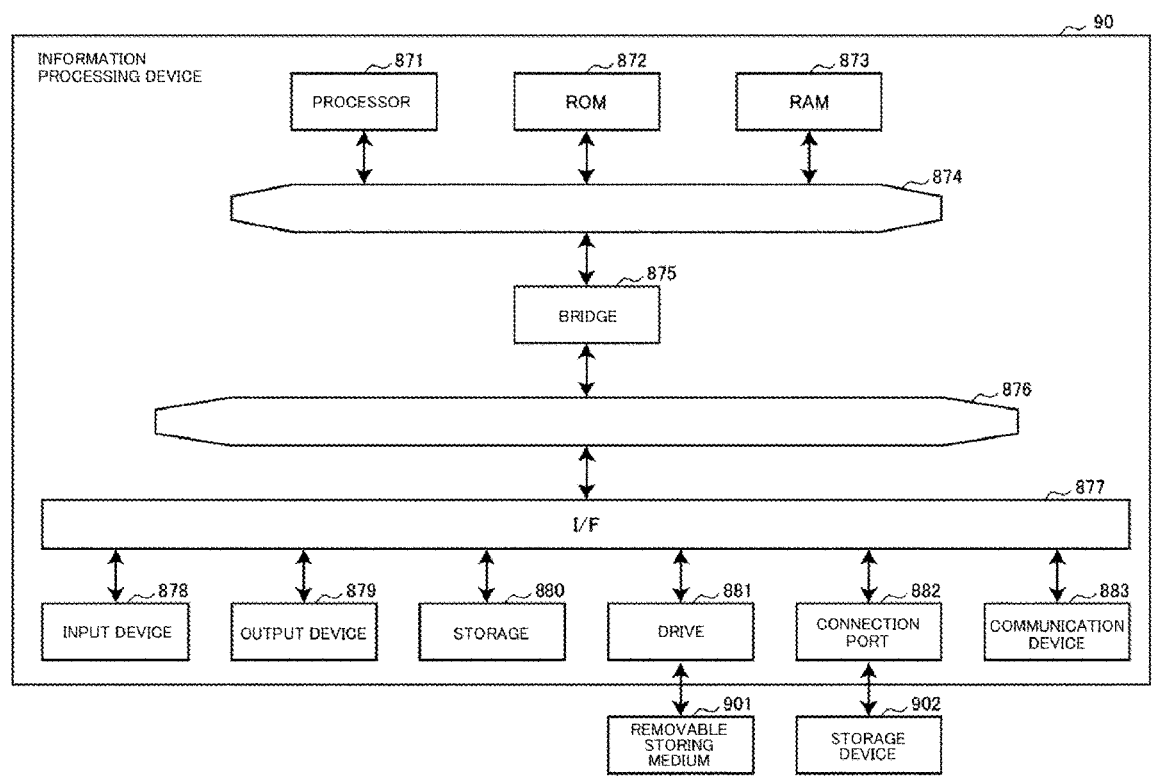
FIG. 11 is a block diagram illustrating a hardware configuration example of an information processing device according to the embodiment.

Next, a hardware configuration example common to the learning device 10 and the estimation device 20 according to an embodiment of the present disclosure will be described. FIG. 11 is a block diagram illustrating a hardware configuration example of an information processing device 90 according to an embodiment of the present disclosure. The information processing device 90 may be a device having the same hardware configuration as each of the above-described devices. The information processing device 90 includes a processor 871, a ROM 872, a RAM 873, a host bus 874, a bridge 875, an external bus 876, an interface 877, an input device 878, an output device 879, a storage 880, a drive 881, a connection port 882, and a communication device 883, as illustrated in FIG. 11 for example. The hardware configuration illustrated herein is an example, and some of the components may be omitted. Further, components other than the components illustrated herein may be further included.

(Processor 871)

The processor 871 functions as, for example, an arithmetic processing device or a control device, and controls all or some of the operations of the components on the basis of various types of programs recorded in the ROM 872, the RAM 873, the storage 880, or a removable recording medium 901.

(ROM 872, RAM 873)

The ROM 872 is a means for storing a program read into the processor 871, data used for computation, and the like. In the RAM 873, for example, a program read into the processor 871, various types of parameters that change as appropriate when the program is executed, and the like are temporarily or permanently stored.

(Host Bus 874, Bridge 875, External Bus 876, Interface 877)

The processors 871, the ROM 872, and the RAM 873 are connected to each other via, for example, the host bus 874 capable of high-speed data transmission. On the other hand, the host bus 874 is connected to the external bus 876 with a relatively low data transmission speed via, for example, the bridge 875. The external bus 876 is connected to various components via the interface 877.

(Input Device 878)

For the input device 878, for example, a mouse, a keyboard, a touch panel, buttons, switches, levers, and the like are used. Further, as the input device 878, a remote controller capable of transmitting a control signal using infrared rays or other radio waves may be used. The input device 878 includes a voice input device such as a microphone.

(Output Device 879)

The output device 879 is, for example, a device capable of notifying users of acquired information visually or audibly, such as a display device such as a CRT (Cathode Ray Tube), an LCD, or an organic EL, an audio output device such as a speaker or a headphone, a printer, a mobile phone, a facsimile, or the like. The output device 879 according to the present disclosure includes various types of vibration devices capable of outputting tactile stimuli.

(Storage 880)

The storage 880 is a device for storing various types of data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, and the like. Naturally, the removable recording medium 901 may be, for example, an IC card equipped with a non-contact type IC chip, an electronic device, or the like.

(Connection Port 882)

The connection port 882 is a port for connecting an external connection device 902 such as a Universal Serial Bus (USB) port, an IEEE1394 port, a Small Computer System Interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication device 883)

The communication device 883 is a communication device for connecting to a network, and is, for example, a communication card for wired or wireless LAN, Bluetooth (registered trademark), or Wireless USB (WUSB), a router for optical communication, a router for Asymmetric Digital Subscriber Line (ADSL), or a modem for various types of communications.

3. CONCLUSION

As described above, the estimation device 20 that implements an information processing method according to an embodiment of the present disclosure includes the estimation unit 220 that estimates, based on an input image, the classes of objects that are present in a real environment corresponding to the imaging range of the input image. The objects include acoustically useful objects having acoustic features useful for specifying their class. Further, the estimation unit 220 according to the embodiment of the present disclosure has a feature of estimating the class of an acoustically useful object based on acoustic data collected from around the acoustically useful object.

According to the above-described configuration, it is possible to effectively improve the estimation accuracy of the object class.

Although the preferred embodiments of the present disclosure have been described in detail with reference to the accompanying figures as described above, the technical scope of the present disclosure is not limited to such examples. It is apparent that those having ordinary knowledge in the technical field of the present disclosure could conceive various modified examples or changed examples within the scope of the technical ideas set forth in the claims, and it should be understood that these also naturally fall within the technical scope of the present disclosure.

In addition, the steps related to the processing described in the present specification do not necessarily have to be processed in chronological order in the order described in the flowchart. For example, the steps related to the processing of each device may be processed in an order different from the order described, or may be processed in parallel.

Further, the series of processing by each device described in the present specification may be implemented by using any of software, hardware, and a combination of software and hardware. Programs constituting the software are stored in advance in, for example, a recording medium (non-transitory medium) provided inside or outside the respective devices. Then, each program is read into a RAM at the time of execution by a computer and executed by various types of processors, for example. The recording medium is, for example, a magnetic disk, an optical disc, a magneto-optical disk, or a flash memory. Further, the above computer program may be distributed via, for example, a network without using the recording medium.

Further, the effects described in the present specification are merely explanatory or exemplary and are not intended as limiting. In other words, the technologies according to the present disclosure may exhibit other effects apparent to those skilled in the art from the description herein, in addition to or in place of the above effects.

Further, the following configurations also fall within the technical scope of the present disclosure.

(1) An information processing device including: an estimation unit that estimates, based on an input image, a class of an object that is present in a real environment corresponding to an imaging range of the input image, wherein the object includes an acoustically useful object having an acoustic feature useful for class estimation, and the estimation unit estimates a class of the acoustically useful object based on acoustic data collected from around the acoustically useful object.

(2) The information processing device according to (1), wherein the estimation unit estimates the class of the acoustically useful object based on acoustic data collected at at least one sound collection position that is determined according to a position of the acoustically useful object in the real environment, which is estimated based on the input image.

(3) The information processing device according to (1) or (2), wherein the estimation unit estimates the class of the acoustically useful object by using an estimator generated by machine learning using acoustic data related to the acoustically useful object as learning data.

(4) The information processing device according to (1), wherein the estimation unit creates a composite image that visually shows the acoustically useful object.

(5) The information processing device according to (4), wherein the estimation unit creates the composite image by using an estimator generated by machine learning in which acoustic data related to the acoustically useful object is input and an image related to the acoustically useful object is output.

(6) The information processing device according to (5), wherein the estimator is generated by machine learning to reduce a difference between an image output from a neural network and an image of an acoustically useful object captured at the same time as acoustic data to be input to the neural network.

(7) The information processing device according to any one of (4) to (6), wherein the estimation unit creates a superimposed image in which the created composite image is superimposed on the input image.

(8) The information processing device according to any one of (1) to (7), wherein the acoustically useful object includes an object whose pixel-based class is difficult to estimate in the input image.

(9) The information processing device according to any one of (1) to (7), wherein the acoustically useful object includes an object in the real environment that does not appear as a subject in the input image.

(10) The information processing device according to (9), wherein the estimation unit estimates the class of the acoustically useful object based on acoustic data collected at at least one sound collection position that is determined according to a position where the acoustically useful object may be present in the real environment, which is estimated based on the input image.

(11) The information processing device according to any one of (1) to (10), further including an acoustic collection unit that collects the acoustic data from around the acoustically useful object.

(12) The information processing device according to (11), wherein the acoustic collection unit collects the acoustic data by utilizing a change in an optical signal accompanied by vibration of particles in air.

(13) The information processing device according to (11) or (12), wherein the acoustic collection unit outputs a predetermined acoustic signal for the acoustically useful object and collects acoustic data related to a reflected sound reflected by the acoustically useful object.

(14) The information processing device according to (13), wherein the acoustic collection unit outputs the acoustic signal at at least one output position that is determined according to a position of the acoustically useful object in the real environment, which is estimated based on the input image.

(15) The information processing device according to any one of (1) to (14), further including an imaging unit that captures the input image.

(16) The information processing device according to any one of (1) to (15), further including a presentation control unit that controls presentation of information related to the class of the acoustically useful object estimated by the estimation unit.

(17) The information processing device according to (1) to 16, mounted on a moving object.

(18) The information processing device according to (17), wherein the estimation unit controls the moving object based on the estimated class of the acoustically useful object.

(19) An information processing method including estimating by a processor, based on an input image, a class of an object that is present in a real environment corresponding to an imaging range of the input image, wherein the object includes an acoustically useful object having an acoustic feature useful for class estimation, and the estimating includes estimating a class of the acoustically useful object based on acoustic data collected from around the acoustically useful object.

REFERENCE SIGNS LIST

10 Learning device
110 Learning unit
20 Estimation device
210 Imaging unit
220 Estimation unit
230 Acoustic collection unit
240 Presentation control unit
30 Object DB
40 Training DB

The invention claimed is:

1. An information processing device, comprising:
a central processing unit (CPU) configured to:
estimate, based on an input image, a class of an object that is present in a real environment, wherein
the object includes an acoustically useful object that has an acoustic feature, and
the real environment corresponds to a range of the input image;
collect acoustic data of the acoustically useful object;
estimate a class of the acoustically useful object based on the collected acoustic data;
generate a first estimator based on machine learning in which the collected acoustic data is input at a specific time and a first image related to the acoustically useful object is output;
obtain a second image of the acoustic useful object, wherein the second image is captured at the specific time;
reduce a difference between the first image and the second image based on the generated first estimator; and
create a composite image based on the reduced difference, wherein the composite image displays the acoustically useful object.

2. The information processing device according to claim 1, wherein the CPU is further configured to:
determine at least one sound collection position based on a position of the acoustically useful object in the real environment, wherein the position of the acoustically useful object is based on the input image; and
estimate the class of the acoustically useful object based on the collected acoustic data at the at least one sound collection position.

3. The information processing device according to claim 1, the CPU is further configured to:
generate a second estimator by machine learning based on the collected acoustic data; and
estimate the class of the acoustically useful object by the second estimator.

4. The information processing device according to claim 1, wherein the CPU is further configured to create a superimposed image in which the created composite image is superimposed on the input image.

5. The information processing device according to claim 1, wherein the class of the object is difficult to estimate in the input image.

6. The information processing device according to claim 1, wherein the input image includes a subject that corresponds to a specific object different from the acoustically useful object.

7. The information processing device according to claim 6, wherein the CPU is further configured to:
determine at least one sound collection position based on a position of the acoustically useful object in the real environment, wherein the position of the acoustically useful object is based on the input image; and
estimate the class of the acoustically useful object based on the collected acoustic data at the at least one sound collection position.

8. The information processing device according to claim 1, wherein the CPU is further configured to collect the acoustic data from a vicinity of the acoustically useful object.

9. The information processing device according to claim 8, wherein the CPU is further configured to collect the acoustic data based on a change in an optical signal accompanied by vibration of particles in air.

10. The information processing device according to claim 8, wherein the CPU is further configured to:
output a specific acoustic signal for the acoustically useful object; and
collect the acoustic data related to a sound reflected by the acoustically useful object.

11. The information processing device according to claim 10, wherein the CPU is further configured to:
determine at least one output position based on a position of the acoustically useful object in the real environment, wherein the position of the acoustically useful object is based on the input image; and
output the specific acoustic signal at the at least one output position.

12. The information processing device according to claim 1, further comprises an image sensor configured to capture the input image.

13. The information processing device according to claim 1, wherein the CPU is further configured to control presentation of information related to the class of the acoustically useful object.

14. The information processing device according to claim 1, wherein the information processing device is mountable on a moving object.

15. The information processing device according to claim 14, wherein the CPU is further configured to control the moving object based on the estimated class of the acoustically useful object.

16. An information processing method, comprising:
estimating, based on an input image, a class of an object that is present in a real environment, wherein
the object includes an acoustically useful object that has an acoustic feature, and
the real environment corresponds to a range of the input image;
collecting acoustic data of the acoustically useful object;
estimating a class of the acoustically useful object based on the collected acoustic data;
generating a first estimator based on machine learning in which the collected acoustic data is input at a specific time and a first image related to the acoustically useful object is output;
obtaining a second image of the acoustic useful object, wherein the second image is captured at the specific time;
reducing a difference between the first image and the second image based on the generated first estimator; and
creating a composite image based on the reduced difference, wherein the composite image displays the acoustically useful object.

* * * * *